United States Patent [19]

Miller et al.

[11] Patent Number: 4,726,530
[45] Date of Patent: Feb. 23, 1988

[54] METHOD OF RESOURCE RECOVERY FROM USED TIRES

[75] Inventors: David Miller, Port Washington; Daniel J. Priscu, Commack, both of N.Y.

[73] Assignee: Energy Recovery Systems, Inc., Great Neck, N.Y.

[21] Appl. No.: 11,362

[22] Filed: Feb. 2, 1987

Related U.S. Application Data

[63] Continuation of Ser. No. 763,184, Aug. 7, 1985, abandoned.

[51] Int. Cl.$^4$ ............................................. B02C 19/12
[52] U.S. Cl. ........................................ 241/24; 241/29; 241/236; 241/DIG. 31
[58] Field of Search ............ 241/24, 29, 19, DIG. 31, 241/73, 80, 97, 76, 77, 78, 236, 138, 143, 144, 235, 79.1

[56] References Cited

U.S. PATENT DOCUMENTS

| | | | |
|---|---|---|---|
| 2,462,645 | 2/1949 | Knowland | 241/DIG. 31 X |
| 3,727,850 | 4/1973 | Krigbaum | 241/159 |
| 3,931,935 | 1/1976 | Holman | 241/159 X |
| 4,025,990 | 5/1977 | Lovette, Jr. | 241/DIG. 31 X |
| 4,156,508 | 5/1979 | Kisielewski | 241/DIG. 31 X |
| 4,241,882 | 12/1980 | Baikoff | 241/DIG. 31 X |
| 4,422,581 | 12/1983 | Chrtst | 241/DIG. 31 X |

FOREIGN PATENT DOCUMENTS 11185  1/1979  Japan .......................... 241/DIG. 31

Primary Examiner—Mark Rosenbaum
Attorney, Agent, or Firm—Collard, Roe & Galgano

[57] ABSTRACT

A continuous process for reclaiming rubber, steel and fiber products from tires wherein the tires and tire material flow on conveyors throughout the various steps of the process, including the steps of shredding a flow of whole tires into pieces in a shear-type shredder, and screening the flow of tire pieces by size into a first flow containing pieces at least as large as a specified size, and a second flow containing pieces under a specified size. Reshredding and rescreening the pieces of the first flow is performed until they are smaller than the specified size. Granulating the pieces of the second flow occurs in a first granulator wherein the pieces remain in the granulator until they are reduced below a second specified size. Fiber materials are vacuumed from the flow of granulated material with an air separator after granulation and steel and steel-containing rubber pieces are removed from the flow of material via a magnetic separator after the fiber materials have been removed.

10 Claims, 6 Drawing Figures

METHOD OF RESOURCE RECOVERY FROM USED TIRES

This application is a continuation of application Ser. No. 763,184, filed Aug. 7, 1985, now abandoned.

This application relates to a method for recovering resources from used tires. More particularly, this invention relates to a method for extracting steel and fiber products from used tires, and converting the rubber in the tire into a valuable resource having a variety of uses.

BACKGROUND OF THE INVENTION

Currently in the U.S., used or scrap tires are being discarded at a rate in excess of 200 million tires a year, while almost 3 billion tires have already been discarded. Approximately 1.5 waste tires per motor vehicle per year are produced in this country, and only a small fraction of these are used in some way. The most common method of disposal of unwanted tires is land filling, which creates serious environmental problems, and is also a significant loss of resources.

Waste tires are troublesome in sanitary land fills. Whole tires are bulky, and on the average, less than six passenger tires occupy over one cubic yard of land fill space. Whole truck and bus tires occupy even more space. Tires which are compacted in bulk into a land fill tend to spring back to their former shape, and also tend to work up to the surface, or "float" while the fill is settling. As a result, some land fill operators prefer waste tire stockpiling to burying. Stock piling however creates other problems. When tires are to be buried in land fills, the compaction machine or bulldozer operators generally try to spread out the tires that are deposited with the daily supply solid waste, and attempt to bury them under as much other waste as possible. If buried under less than two feet of other waste, the tires will tend to surface during the waste compaction process or the daily cover process. When completing a land fill "cell" or portion of the land fill area, operators try to keep tires out of the last eight to ten feet of compacted waste. If this final segregation of tires is not accomplished, waste tires buried too shallow will often surface or "float" through the final cell cover. It has been reported that waste tires have even surfaced through roads built across completed cells. From an economic standpoint, burying waste tires in land fill requires special operations, and is therefore substantially more costly than land fill of other solid waste materials. Many land fill operators have placed special charges on disposal of tires and in some cases have refused to dispose of tires at all.

As a result, a substantial percentage of waste tires are presently being disposed of through indiscriminate dumping practices. This results in the accumulation of waste tires along roadsides, in ravines, and in wooded areas. In these areas, the tires can serve as a breeding ground for mosquitos, thereby establishing a potential threat to humans through the spread of California Encephalitis. This disease is transmitted through the bite of diseased (virus infected) "tree hole" mosquitos. This particular mosquito, the only variety which carries the virus, lives and breeds in temperate hardwood forests. The treehole mosquito lives in or very near wooded areas and breeds in small pools of water that collect in stumps, hollow trees, or anything that holds water. Waste tires are believed to be a favorite breeding spot because they provide an ideal water container and acts as a natural solar water heater, which can induce earlier breeding in the spring. Spraying via aircraft is ineffective in combating these mosquitos, because they remain sheltered within the hollow spaces of the tire. Discarded tires also provide breeding grounds for rats and other vermin.

Stockpiled tires also present serious fire hazards. Although they are not easily ignited, once burning, tires are difficult to extinguish and produce a thick acrid smoke. It is difficult or impossible for firefighters to travel through or over stacks of tires. In addition, due to their geometry, tires piled up in almost any configuration automatically provide their own air supply. As tires burn, the intense heat given off breaks up the hydrocarbons in the tire material, and convert them back to oil. It is estimated that a completely burned tire yields three to four gallons of oil. The oil itself of course, creates its own environmental and fire hazards. Toxic smoke from tire fires can cause tearing of the eyes, headaches, sore throat, shortness of breath, and vomiting. Tire contents include sulphur, sulphur dichloride, sulphuryl chloride, quinones, and nitro benzines, all of which produce toxic gases or irritants, when burned. In a recent tire fire in Waterbury, Conn., an estimated one million tires collected on a four acre lot burned for about three weeks before the fire department was able to completely extinguish it. The firefighters were forced to wear surgical masks to protect themselves against inhaling the smoke and even then they were not well protected.

In addition to the problems associated with stockpiling of discarded tires as described above, mountains of tires also create an eyesore. Tires are essentially non-biodegradable and therefore present unusual and difficult disposal problems.

In the past, many tires were recapped so that there were many fewer tires being continuously discarded. However, in the past decade the American public has shown an increased preference for purchasing steel belted radial tires over bias belted tires. This trend is generating a tremendous increase in the number of steel belted radial tires which are eventually discarded. The recapping industry has extremely stringent standards for steel belted radial casings. So stringent, in fact, that only a small percentage of this type of passenger car tire completes the recapping cycle. This reduced recapping potential for radials is one source of the increase in waste tires. Most tires presently being discarded are of the steel belted radial design. This aspect is significant because any further processing of waste tires for secondary use must take into consideration the physical properties of the steel belted radial tire and its purposefully designed resistance to cutting, shredding, etc.

Of course, retreading is the preferred way of handling these tires as it not only solves the disposal problem, but it also saves energy and recycles resources. However, presently only approximately 19% of all passenger tires are retreaded, and the trend is downward. Transportation and labor costs combined with lower prices of new tires work against the retreading industry. In addition, truck and especially airplane tires can be retreaded over and over again, but a passenger tire usually can only be retreaded once or twice because of the lower pressure at which it is used. Also about 10% of all tires cannot be retreaded because they represent obsolete styles or sizes for which there is no market. Many smaller retreaders do not attempt to deal with radials because of the large number of molds required to fit radials properly and the inherent problems in radials caused by separation and sidewall distortion. Moreover, retreading of radial tires requires a relatively large number of molds to handle a range of tire sizes, when compared to bias tires. However, there is substantial agreement in the industry that lack of suitable casings is the primary limiting factor in the retreading business. Demand has been healthy in recent years, but perhaps only 60% of all tires removed from road vehicles are inspected for retreadibility. Also, as previously described above, many retreaders are not properly equipped to deal with steel belted radials, which are increasingly penetrating the market.

Rubber reclaiming is another method of disposing of used tires. This industry utilizes one of the oldest technologies available for recycling waste tires and other scrap rubber products. Major reclaiming processes today represent only a slight modification of the processes used at the end of the last century. Although this industry disposes of a significant number of tires annually (approximately ten million in recent years), it faces problems which restrict output and available markets. Specifically these problems are:

(1) A relatively low grade of rubber is produced containing several types of carbon black.
(2) Tire performance standards and increasingly specialized formulations for tire construction have reduced the demand for reclaimed rubber as a component in new tires.
(3) Reclaimed black rubber is not considered aesthetically desirable.
(4) Reclaimed processes are highly labor intensive.

Low operating margins have prevented a significant research and development program which might lead to the production of a superior product with reduced labor and energy requirements. In addition, the continued infringement on the entire rubber products industry by the plastics industry reduces the need for reclaimed rubber. Although reclaiming is significantly less energy intensive than virgin rubber production, the market share of reclaimed rubber has declined steadily dispite higher oil prices. Presently, this method of tire disposal represents at most a few percentage points of all tires disposed.

Similarly, the tire splitting industry does not significantly help in disposing of used tires. The tire splitting industry produces various industrial products die cut from obsolete tires. These products include gaskets, shims, insulators, doormats, and various other items for the automotive industry. It is estimated that presently this industry consumes only 2 million used tires per year. As with rubber reclamation, steel belted radials also present a particular problem for tire splitters and partially account for lack of growth in this industry.

Although present reclaiming processes do not yield rubber of a quality comparable to new rubber, it is possible, by more complex processes, to recover some of the chemical ingredients of tires for use in new synthetic rubber. At least three of such processes are under development. However, none of these processes can operate at a profit, and they have not been applied commercially. Destructive distillation and carbonization are two forms of pyrolysis, a controlled heating process that decomposes materials in the absence of oxygen. Hydrogenization, on the other hand, is a process of chemical synthesis. It involves the addition of hydrogen, the element which is removed from oil to make synthetic rubber, in order to return rubber to its original form. Tires are composed of 83% carbon, 7% hydrogen, and 6% ash, plus small quantities of nitrogen, oxygen, and sulphur. Pyrolysis of tires yields oils, gases, and carbon containing residue. The main difference between destructive distillation and carbonization is the process temperature. At carbonization's higher temperatures, the main product yielded is carbon black, which makes up from $\frac{1}{4}$ to $\frac{1}{3}$ of the synthetic rubber from which tires are made. The present costs of carbonization are substantially higher than the costs of making carbon black commercially from petroleum. In destructive distillation, as many as fifty gases and liquids are formed, plus a residue consisting mostly of carbon and representing from 35 to 60% of the original weight. The residue could be a high quality fuel, except that it contains 1.5% sulphur. Due to the costs involved, no significant amount of tires are presently reclaimed via pyrolysis or hydrogenization. This alternative use for discarded tires is not yet economically feasible.

Among the more novel uses for used tires is the construction of artificial reefs. Major tire companies have been involved with artificial reef programs on both the east coast and gulf coast. Several thousand reefs have already been built using as many as 3 million tires per reef. In the oceans, whole tires become rapidly encrusted with marine life thus forming a reef attractive to many species of fish. These reefs can be beneficial to commercial fisherman and the recreational fishing industry. The simplest design for reef construction costs from 30 to 40 cents per tire assuming that the tires are delivered on site. The potential use for tires on reefs has been estimated to be in excess of one and a half million tires per year, however, this is less than 0.50% of all tires discarded annually. Also, transportation costs from inland areas pose a significant problem for this use.

Floating tire breakwaters to protect marinas and shore lines subject to erosion have also been developed. Breakwaters have been built and put to use in many areas throughout the country. Presently, it is estimated that breakwaters could use only approximately 250,000 tires per year. As with artificial reefs, transportation costs tend to prevent this type of disposal.

Another rather novel use for used tires is the construction of crash barriers. Used tires have been tested as impact barriers for divider strips, bridge abutments, support posts, guard rails, and overpasses. The barriers are constructed of horizontally stacked tires fastened together with steel cables in tension. Experimental head-on and side angle collisions indicate that the barriers may be effective in reducing injury. However, these barriers may not be suitable for small light-weight vehicles, and additional tests are needed to improve their performance. The barriers have not been approved as a highway hardware item, and it is not known how many used tires these barriers could consume.

Several other uses for used tires are still in the experimental stage. Experiments have been conducted with several micro-organisms which could reduce the size of rubber particles as well as separate oil hydrocarbons from rubber. However, frequently the micro-organisms are supressed by other ingredients in the tire. Ground scrap rubber has also been proposed for utilization as mulch in cultivated fields and in potting soil. The toxic effects, if any, of rubber on plant life in general has not been determined. Crumb rubber, or finely ground rubber, has potential uses in construction as an insulation, pipe coating, or roofing material supplement.

Probably the most promising method of disposing of used tires is converting them into a fuel source. The use of waste tires as a fuel has been approached in two separate technologies, the use of whole tires for fuel, and the use of prepared tires, or tire pieces as fuel. Generally, the systems that have been developed for the incineration of whole tires as a preliminary fuel have encountered substantial problems in the area of incomplete combustion and therefore, their pollutant emissions.

In the area of prepared used tires as a supplementary fuel (mixed with coal), an extensive amount of work has been done. General Motors and the Fisher Body Plant in Pontiac, Mich., completed a development study of the feasibility of burning a mixture of 10% shredded rubber and 90% coal by weight in an industrial size stoker-fired boiler. The equipment used for handling and mixing shredded rubber with the coal performed satisfactorily. However, the rubber tended to jam in certain machinery. There were no operation or deterioration problems with the boilers. Stack emission tests revealed compliance with both the Michigan State particulate and $SO_2$ codes. The rubber-coal fuel mixture represented a yearly savings of approximately 6% of the powerhouse fuel costs, not including capitalization costs on the rubber handling equipment. In the General Motor's tests, shredded rubber was mixed directly with the coal through the coalcar unloading grates. While air pollution emission testing indicated an increase in particulate emissions when the rubber and coal mixture was burned, the emission levels were still within code. The low cost of coal at that time (1970) and the relatively high cost of shredding tires, plus the material problems associated with shredded rubber, caused the project to be discontinued.

During the approximate six months that the coal-rubber mixture was burned a total of five particulate emission tests were carried out on various boilers burning the 10% rubber and 90% coal mixture. The average particulate increase over coal firing was 62.4%. Of this increase, 15% was from zinc oxide, with the remaining 47.4% in particulate emission assumed to be composed of tire belting material, other structural material in the tires, and grinding fines. Sulphur dioxide emissions actually decreased as result of burning the mixed fuel. The rubber, which has a low sulphur content of approximately 1% and high BTU content per pound, decreases the amount of $SO_2$ generated per BTU of heat release. Due to the high temperatures and the excess air used in the industrial stoker fired boilers, there were no odor problems encountered in burning the shredded scrap rubber.

In May 1985 emission tests were conducted at a Ford Motor Company boiler in Brookpark, Ohio, which was burning a mixture of approximately 15% recycled rubber and 85% coal. These tests revealed that the levels of particulate emissions were significantly below the Environmental Protection Agency permissible level.

The use of shredded scrap tires in road building appears to be another promising way of disposing of used tires. There is a considerable amount of historic precedence for using pieces of scrap tires in road building as an aggregate for the road surface itself and also as an asphalt additive or binder. Evidence shows that the rubber improves the road surface in terms of wear and also seems to make a good patching compound. Although most experimenting with rubberized roads has been completed in Europe, some 10,000 miles of rubberized roads have already been built in the U.S. Specialized surfaces such as bridge pavement, tennis courts, playgrounds, and running tracks have successfully included rubber compounds. However, a majority of these surfaces have been made with newly manufactured synthetic rubber compounds rather than old rubber from these tires. Compounds made primarily from re-claimed tire rubber have been used in road surfacing in at least 52 projects in 9 states. A report by the Engineers Office for the City of Phoenix, indicated that after 11 years, the asphalt rubber system used in road paving projects there was performing well. The paving material used in Phoenix was composed of hot asphalt cement mixed with 25% ground tire rubber and diluted with kerosene for easy application, or by an alternative process including hot asphalt cement mixed with 18 to 22% ground rubber and diluted with an oil extender. The report stated that the asphalt rubber concept has proven the value of a truly flexible and elastic member as a crack reflection preventative. The engineers report concluded that "the use of asphalt rubber also will be continued because of its sound engineering properties, economic advantages and success as a surface for our streets, highways, and airports."

Adding shredded used tires to paving material also saves energy. Although the cost of asphalt rubber is initially higher than the customary bituminous road paving materials, its life expectancy is approximately 5 times greater than the non-rubber containing material, thereby offsetting the higher cost. Ground rubber used in paving materials must be free of any foreign matter (metals and fibers) and have a mesh size of minus 16 to plus 25. To pave one lane mile with asphalt 2" thick requires over 300 gallons of petroleum. Assuming a rubber-asphalt system lasts three times longer than a standard asphalt highway, then 300 gallons of oil are saved over that period of time per lane mile. In 1978, there were over 600,000 lane miles paved with asphalt in the United States. Had the rubber-asphalt system been employed, almost 200 million gallons of petroleum would have been conserved, based on the figures above. A recently enacted federal law makes it mandatory to use recycled rubber granules, subject to availability, on all new federal road construction or repair.

As described above, tires may be used on a large scale as a source of fuel. However, they must be first adequately prepared to insure a successful burning operation. Test results indicate that whole tires do not make a good fuel source but that tire pieces can be used as a valuable supplemental fuel. It has been shown that the size of a chip or portion of tire to be used as fuel in a stoker-fired boiler designed for coal should be about 2". Tests at the General Motors plant concluded that tire fines (0 to $\frac{1}{4}$" pieces) are not desirable because of the amount of suspension burn and resulting emissions. Therefore, a used tire must be processed down to about $1\frac{1}{2}$ to 2" chips for use as a supplemental fuel in a stoker-fired boiler. Similarly, rubber for use in road paving materials must be in the form of small granules.

Three used tire size reduction processing systems, i.e. mechanical, cryogenic-mechanical, and cryogenic have been used. Mechanical size reduction involves slicing or beating the tire into small strips or chunks. This type of size reduction is the least expensive per tire and can produce a compatible feed material for stoker-fired spreader boilers. The cryogenic and cryogenic-mechanical size reduction systems are quite similar to each other. The cryogenic-mechanical system operates on a chunk of strip feed, whereas the straight cryogenic system accepts whole tires. Both of these systems operate on the principle of lowering the temperature of the rubber below its brittle temperature by spraying or dipping the tire in some cryogenic substance and then crushing the frozen material. Dry ice, dry ice with methanol, and liquid nitrogen, have all been used as cryogenic materials. Liquid nitrogen, with a boiling point of −196° C., is most commonly used. The use of liquid nitrogen in a cryogenic-mechanical system is more efficient than the other cryogenic materials, because of its larger surface-area-to-volume ratio. In addition, after freezing, a smaller hammermill can be used, reducing capital and operating costs.

With all three of the tire reduction systems, the chip size and impurity content of the product must be controlled, if it is to be useable as a fuel or paving material source. If the rubber for fuel is not prepared to a consistant size within the specification range, and oversized chips enter the fuel system of a boiler, mechanical problems may arise. The large chips of rubber do not have the consistancy of coal, and therefore, do not "crush out" between mechanisms. This may result in flow blockage or mechanical breakdown in the fuel feed mechanical system. Alternatively, if the fuel has a high percentage of fines (small particles of rubber), problems may result in excessive super heater temperatures or excessive loading of air polution equipment as a result of suspension burning.

In addition to rubber, tires include steel or fiber products, which normally must be removed from rubber which is to be used as a fuel or paving material source. A typical steel belted passenger tire contains approximately 5 lbs. of steel. Fabric tires may include rayon, nylon, or polyester, in addition to a steel bead. The steel and fibers must normally be removed in order to provide a fuel which can be efficiently fed into a stoker and burned. In some boilers however, rubber chunks containing fibers and steel can be used, with the fibers being combusted with the rubber and the steel being removed afterwards from the grates.

Although the tire recycling concept is not new the previously used recycling methods worked well only on fabric tires, and had only limited ability to handle steel belted tires and truck tires. In addition, the conventional hammermill methods involve relatively high costs, are not energy efficient, and cannot handle large quantities of tires effectively. Moreover, existing methods have required manual separation of fibers and steel.

Accordingly, it is an object of the present invention to provide an improved process for converting used tires into a valuable rubber resource having a variety of uses.

It is also an object of the invention to provide such a process which also automatically extracts steel and fiber material from used tires for recycling.

SUMMARY OF THE INVENTION

Certain of the foregoing related objects are readily attained in a continuous process for reclaiming rubber, steel and fiber products from tires wherein the tires and tire material flow on conveyors throughout the various steps of the process which includes the steps of shredding a flow of whole tires into pieces in a shear-type shredder and screening the flow of tire pieces by size into a first flow containing pieces at least as large as a specified size, and a second flow containing pieces under a specified size. Then by reshredding and rescreening the pieces of the first flow, until they are smaller than the specified size, these pieces are prepared for further processing. Granulating the pieces of the second flow in a first granulator is then performed wherein the pieces remain in the granulator until they are reduced below a second specified size. Fiber materials are removed by vacuuming from the flow of granulated material with an air separator after granulation, and steel and steel-containing rubber pieces are removed from the flow of material via a magnetic separator after the fiber materials have been removed.

Preferably, the process further includes the steps of secondarily granulating the flow of tire material and secondarily vacuuming fiber materials from the flow of material with a second air separator after secondarily granulating the tire material. Steel and steel-containing rubber pieces may then be secondarily removed from the secondarily granulated material to produce a recycled rubber product having a small particle size. Most desirably, the process also includes the step of dividing the flow of material into halves prior to secondarily granulating the material so as to establish parallel secondary processing paths in order to maintain production speed.

In a preferred embodiment, a third sequence of steps are performed including tertiarily granulating the secondarily granulated material and tertiarily vacuuming fiber materials from the flow of tire material, with an air separator after tertiarily granulating the tire material. Similarly, steel and steel-containing rubber pieces are then tertiarily removed from the tertiarily granulated tire material, in order to produce crumb rubber. The granulated tire material may be screened after each granulating step in order to remove particles sufficiently small in size to be used as a product, from the flow of tire material.

Preferably, steel and steel-containing rubber pieces removed by the magnetic separator are conveyed from the magnetic separator to a storage area where they are baled to facilitate their handling and transportation to a steel recycling site.

An analogous series of steps for the fiber materials includes sucking the tire fiber material drawn into the air separators into a dust collector, removing the fiber material from the dust collector, and baling the fiber material to facilitate its handling and transportation.

Most desirably, the specified size to which the flow of the pieces from the shredder are screened is approximately 2.0 inches. With this screen size, the process produces rubber pieces suitable for use as a supplementary fuel in industrial stoker coal-fired boilers.

When the second specified size, or the size above which the tire material continues to be granulated, is approximately 0.75 inches, the process produces rubber pieces suitable for use as a supplementary fuel to be mixed with coal. If the second specified size is approximately 0.10 inches, the process produces crumb rubber.

Other objects and features of the present invention will become apparent from the following detailed description considered in connection with the accompanying drawings, which disclose one embodiment of the invention. It is to be understood that the drawings are to be used for the purpose of illustration only, and not as a definition of the limits of the invention.

BRIEF DESCRIPTION OF THE DRAWINGS

In the drawings:

Turning now in detail to the drawing, therein illustrated is a novel process for reclaiming usable materials from used tires. In FIG. 1, the rectangles represent individual pieces of machinery, each of which carry out a step of the process. The lines connecting the rectangles represent conveying means for transferring the material being processed between machines. Not shown in FIG. 1 are the initial stages of the tire reclaimation system. This includes collecting the used tires from pre-determined points; sorting the tires so that retreadable casings may be salvaged; transporting the tires to the processing facility and optionally shredding the tires at the pick-up site with a mobile shredder unit. (It has been estimated that this operation will increase the supply of retreadable casings by 35%.) Prior to shredding, wheels and rims are removed for sale as scrap or recycling to dealers. As shown in FIG. 1, the tires are first shredded in a shear type shredder. The present embodiment uses a Columbus McKinnon shredder. Alternatively, a MAC Corporation Saturn Model 62-40 shredder may be used. Shear type shredders offer superior performance in shredding steel belted radial tires, as compared to tearing, punch-and-die, hammerhog, milling, and mincing machines.

As shown in FIG. 1, tires are fed by conveyer 1 into shredder 10. Shredder 10 includes two opposing relatively slowly revolving shafts 100, 102 having intermeshing cutters 104. The cutters 104 are thick cam-like disks having teeth 106 or protruding cutting edges. As the tires 108 are fed in, the teeth 106 puncture the tire or engage the bead of the tire. The teeth, following an arc of rotation, then move away from each other as they continuously rotate. The tires 108, engaged on the teeth 106 which are moving apart, are then ripped or shredded via a tearing and shearing action. Although the teeth are not sharpened, they move with great force so that the tire is both pulled apart by the tensile stress, and are also split apart by the tooth which is forced through the tire. As the tires go through the shredder, the steel and fiber materials as well as the rubber itself are pulled apart and shredded into smaller pieces. The shredder can accept whole passenger and truck tires.

Figure 1:
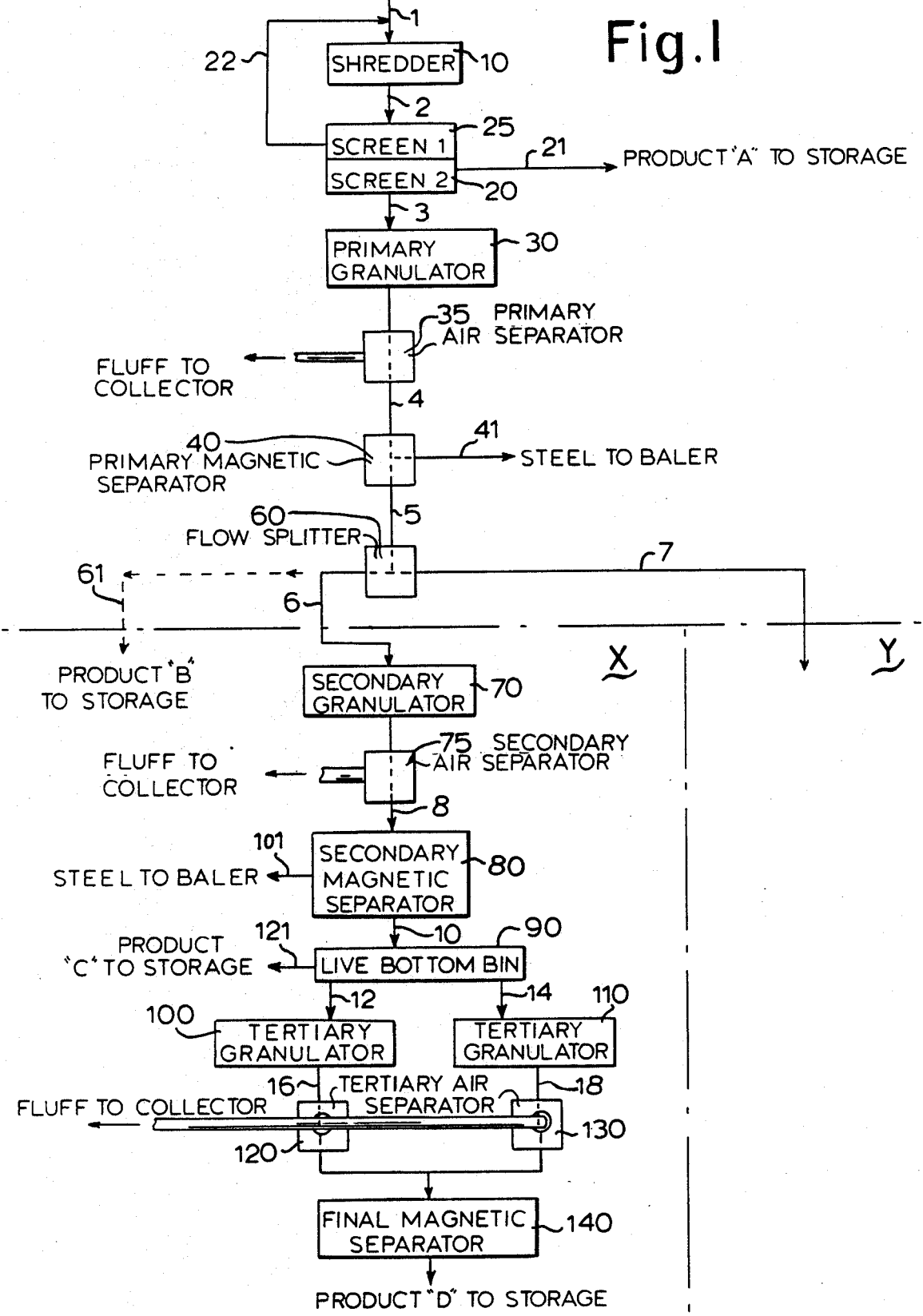
FIG. 1 is a schematic representation of the process according to the invention.
Figure 6:
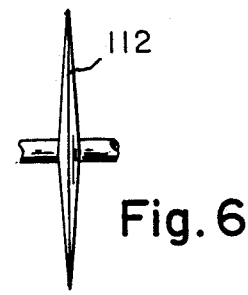
FIG. 6 is a cross-sectional view of the cutting blades of FIG. 5 along the lines 6—6.
Figure 2:
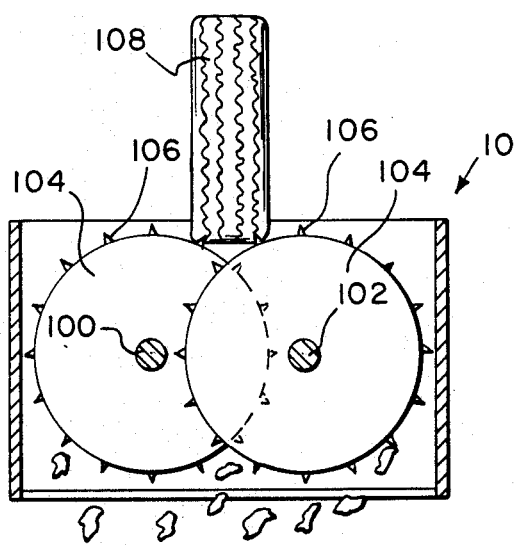
FIG. 2 is a cross-sectional elevational view of the shredding mechanism of the shredder schematically depicted in FIG. 1.
Figure 4:
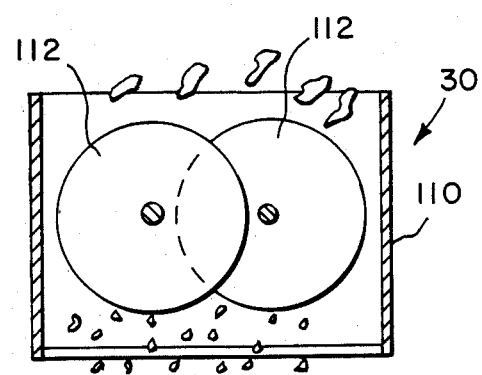
FIG. 4 is a cross-sectional elevational view of the primary granulator schematically depicted in FIG. 1.
Figure 3:
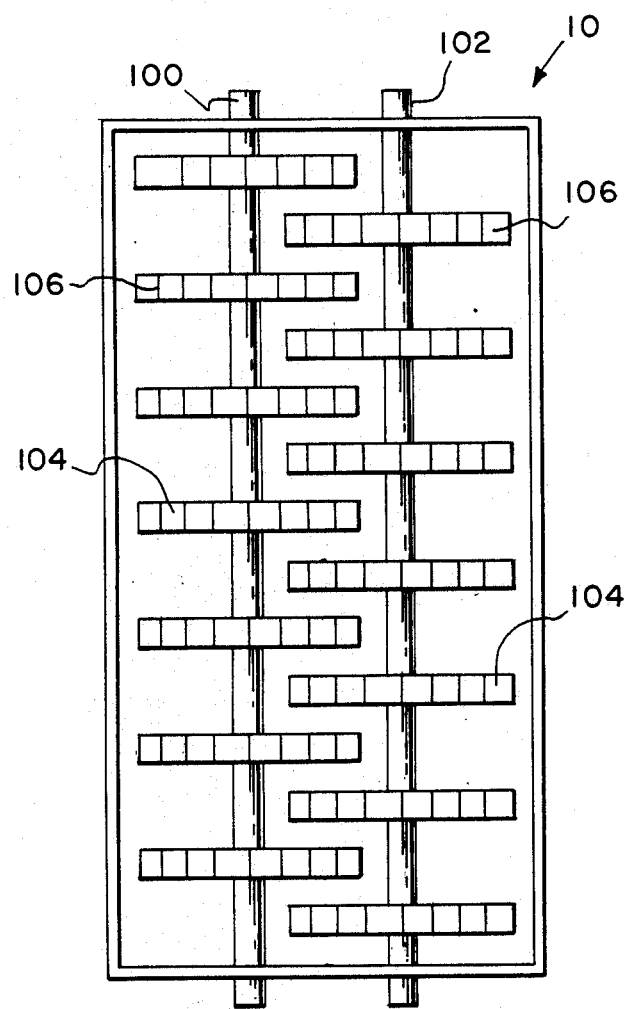
FIG. 3 is a top view of the shredder of FIG. 2.
Figure 5:
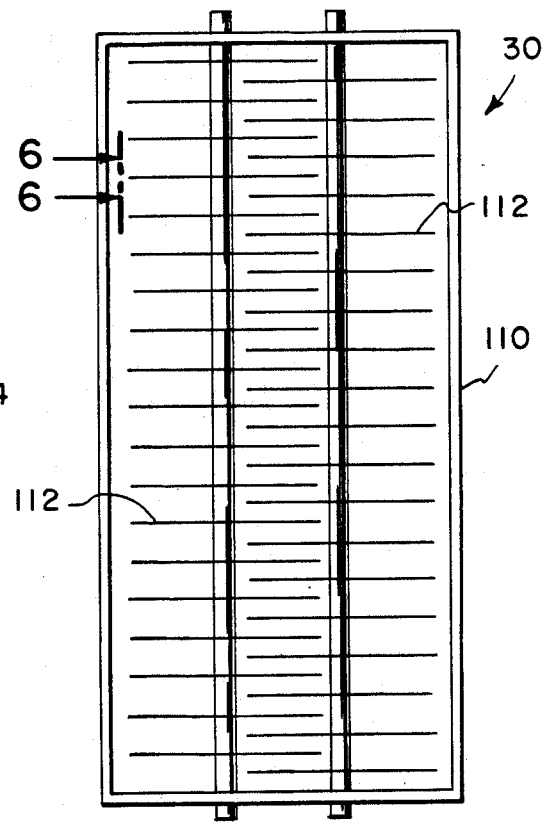
FIG. 5 is a top view of the granulator of FIG. 4.

The shredder converts the whole tires into chunks or strips having a maximum size of 10 to 12 inches in length, in a single operation. The width and thickness of the chunks which emerge from the shredder, will vary depending on the type and size of tire from which the chunks were derived. From the shredder the chunks or tire pieces are transported via conveyor 2 to the first vibrating screen 25 which allows chunks smaller than a specified size to fall through, thereby separating the smaller chunks from the larger pieces. The material which does not fall through the screen, is conveyed back to the shredder 10 via conveyor 22, and is fed into the shredder again, along with whole tires. The chunks which are below a specific size (Product A) pass through screen 25 and fall to conveyer 3 which carries them to a primary granulator 30. Pieces which are at or below the desired product particle size pass through a second vibrating screen 20, and are carried by conveyor 21 to a storage area. The specific size which the vibrating screens will pass, can be adjusted according to end product use, but it is normally set at approximately 2". The adjustment is determined simply by changing the mesh size of the screen material of the vibrating screen.

The screened material now having a maximum size of, e.g., 2.0 inches, is carried on conveyor 3 into the throat of primary granulator 30. This granulator is Cumberland Model 3250 Plastics Granulating machine in a preferred embodiment. The material then falls into the granulator cutting chamber 110 where a staggered series of counter rotating and intermeshing knives 112 cut the chunks into smaller pieces. The steep angle, high shear rotating knives 112 are fabricated from a high chrome, high carbon tool steel. Also included in the cutting chamber are two adjustable bed knives, one up-stroke and one down-stroke, inclined for optimum cutting action and reduced loading. Positioned at the bottom of the cutting chamber, is a screen which allows pieces under a specified size to pass through and fall to conveyor 4. The material entering the granulator remains in the cutting chamber until it has been cut into pieces small enough to pass through the screen.

The material emerging from the primary granulator, passes under a primary air separator 35 in which air flow removes loose fibers. The air separator 35 consists of a series of vacuum hoods disposed over the conveyor. The fibers or "fluff", being lightweight materials, are drawn into the hoods via vacuum and are piped to a fiber or dust collector such as a Research-Cottrell Flex-Kleen WR series dust collector. In the collector, the "fluff" is separated out of the air flow and removed for baling. The remaining material, i.e. chunks of shredded tires and steel, are further conveyed to a primary magnetic separator 40 suspended over the conveyor carrying the material. The magnetic separator has a very strong magnet, around which a pulley mounted belt revolves. As pieces of steel, or chunks of rubber containing steel, moving on the conveyor, approach the magnetic separator, they are magnetically lifted off the conveyor and held against the moving belt along the bottom surface of the magnetic separator. When the belt transports them out of the separator's magnetic field, the steel and/or rubber containing steel chunks are released from the belt and are carried by conveyor 41 to an area for storage for baling, in preparation for resale as scrap steel. Although this scrap steel will include pieces of rubber and/or fabric, this does not effect its value as a recyclable resource. An ERIEZ Manufacturing Co. Series 7000 Suspended Electromagnetic Separator is used in the present embodiment.

Of course, the majority of the material is not lifted from the conveyor by the primary magnetic separator, and as it reaches the end of the conveyor 4 disposed below the primary magnetic separator 40, it falls to conveyor 5. This conveyor transports the material to a material flow splitter 60, which divides the flow of material via conveyors and directs one half of the flow to conveyor 6, and the other half of the flow to conveyor 7, in a known manner. As shown in FIG. 1, splitter 60 separates the flow of material and directs it onto two identical and parallel paths "X" and "Y". The parallel path system is set up in order to increase the production rate. In these paths, the material is further reduced in size in two different steps. If only a single path is provided the throughput of the entire system would be restricted, as the finer size reduction operations require substantially more time than does the initial size reduction.

As the process performed on the material after it is divided is identical in both paths, only the operation of path "X" of FIG. 1, beginning with conveyor 6, is described. Conveyor 6 transfers the material from splitter 60 to a secondary granulator 70. In the embodiment as shown, the secondary granulator is a Cumberland Model 50B plastics granulating machine. This granulator is similar to the first granulator in method of operation, but it is designed to operate on smaller chunks. The spacings between the knife blades are closer together in the second granulator than they are in the first granulator. Similarly, the screen at the bottom of the cutting chamber of the secondary granulator has openings designed to pass smaller particles of rubber. As in the primary granulator, once the material enters into the cutting chamber of the secondary granulator, it remains there until it is sufficiently reduced in size to pass through the screen. Conveyor 8 carries the material which has passed through the secondary granulator 70 to secondary air separator 75 and to secondary magnetic separator 80. Secondary air separator 75 is identical to primary air separator 35. The secondary magnetic separator 80 is positioned above conveyor 8 and has a form and function similar to that of primary magnetic separator 40 described above. Magnetic separator 80 can be a smaller machine as at this point in the process only smaller pieces of steel could be included in the material. Conveyor 10 transports the material from secondary magnetic separator 80 to live bottom bin 90 where it is temporarily stored. If the desired end product is a very fine crumb rubber (Product "D"), the material is conveyed out of bin 90 into two parallel paths by conveyors 12, and 14, into tertiary granulators 100 and 110, respectively. As shown in FIG. 1, in order to maintain production throughput, during very fine particle size reductions, it is necessary to have parallel paths. The tertiary granulators 100, 110 are similar to the primary and secondary granulators, but have still finer knife blade spacings and finer screen openings. In the present embodiment, the tertiary granulators are Cumberland Model 50F machines. After emerging from the tertiary granulators on conveyors 16 and 18, fibers are again removed in the manner described above by air separators 120, 130. The material is then conveyed underneath a tertiary magnetic separator 140 for a final removal of any steel remaining in the product.

The desired product size will vary with its end use. As previously stated, in some situations relatively large pieces of rubber may be used as a fuel source. In contrast fine crumb rubber is required for road paving materials. The process of the invention progressively reduces whole tires into smaller pieces of rubber in a series of steps. If a maximum chunk size of 2" is desired, e.g. for a fuel source, then the material emerging from the first granulator is sufficiently small and need not be further processed. It (Product "B") can then be transported by conveyor 61 from flow splitter 60 to a storage area, as no further granulation or size reduction is required. At any stage of the process, rubber pieces which have been sufficiently reduced in size to meet the end product requirements, may be removed as they do not require any further processing. Conveyor 21 carries (Product "A") particles smaller than the maximum desired size from screen 20 to a storage area. These are particles which were sufficiently reduced in the shredder, and have not required any processing in the granulators. Conveyor 121 similarly carries material which has already undergone two stages of granulation (Product "C") to a storage area. The particles on this conveyor, again, are sufficiently small that there is no need to process them further in the tertiary granulators.

In the embodiment of the invention as shown in FIG. 1, a maximum of 10,000 lbs. per hour of tires can be processed. The average weight of a factory reject passenger tire is approximately 22 to 25 lbs. Used passenger tires average 18 to 22 lbs. For a 25 lb. tire, it is projected that 15 lbs of rubber, 3 lbs. of steel, and 3 lbs. of fiber will be recovered. The estimated total material lost is 4 lbs. per tire, for a 25 lb. tire.

Some of the rubber pieces or particles produced by the process, regardless of size, will contain embedded steel or fibers. However, due to the advantageous shearing operation in the granulators, the rubber pieces do not have protruding steel strands or dangling fibers. These impurities are primarily embedded in and surrounded by rubber and therefore do not interfere with most potential uses.

Thus, while only one embodiment of the present invention has been shown and described, it will be obvious that many changes and modifications may be made thereunto, without departing from the spirit and scope of the invention.

What is claimed is:

1. A continuous process for separating rubber, steel and fiber products from tires for reclamation thereof wherein the tires and tire material flow on conveyors throughout the various steps of the process, comprisng the steps of:

shredding a flow of whole tires into pieces in a shear-type shredder via a tearing and shearing action effected on the tires by intermeshing cutting edges of cam-like disks protruding from two opposing counter-rotating shafts, which cutting edges puncture the tires and move apart as the shafts rotate;

screening the flow of tire pieces, with a vibrating screen, by size into a first flow containing pieces at least as large as a specified size and into a second flow of pieces smaller than said specified size;

reshredding and rescreening the pieces of the first flow until they are smaller than the specified size;

granulating the pieces of the second flow in a first granulor, having a staggered series of steep angle shearing counter-rotating intermeshing knives by a cutting action thereof into smaller pieces such that any steel and fibers remaining the tire pieces are primarily embedded in and surrounded by rubber;

screening the pieces in the granulator such that pieces at least as large as one inch in size remain in the granulator until they are reduced below one inch in size and such that pieces below said size are passed out of the granulator;

separating reclaimable fiber materials from the flow of granulated material by vacuuming with an air separator after granulation;

separating reclaimable steel and steel-containing rubber pieces from the flow of material via a magnetic separator after the fiber materials have been removed.

2. The process according to claim 1, further comprising the steps of:

secondarily granulating the flow of tire material;

secondarily vacuuming fiber materials from the flow of material with a second air separator after secondarily granulating the tire material; and secondarily removing steel and steel-containing rubber pieces from the secondarily granulated material after secondarily vacuuming the fiber materials, to produce a recycled rubber product having a small particle size.

3. The process according to claim 2, further comprising the step of dividing the flow of material into halves prior to secondarily granulating the material so as to establish parallel secondary processing paths in order to maintain production speed.

4. The process according to claim 3, further comprising the steps of:
tertiarily granulating the secondarily granulated material;
tertiarily vacuuming fiber materials from the flow of tire material, with an air separator after tertiarily granulating the tire material; and
tertiarily removing steel and steel-containing rubber pieces from the tertiarily granulated tire material after tertiarily vacuuming the fiber materials, in order to produce crumb rubber.

5. The process according to claim 4, further comprising the step of screening the granulated tire material after each granulating step in order to remove particles sufficiently small in size to be used as a product, from the flow of tire material.

6. The process according to claim 4, further comprising the steps of:
conveying the steel and steel-containing rubber pieces removed by the magnetic separator from the magnetic separator to a storage area; and
baling the steel and steel-containing rubber particles, to facilitate their handling and transportation to a steel recycling site.

7. The process according to claim 4, further comprising the steps of:
sucking the tire fiber material drawn into the air separators, into a dust collector;
removing the fiber material from the dust collector; and
baling the fiber material to facilitate its handling and transportation.

8. The process according to claim 1, wherein said specified size is approximately 2.0 inches, the process thereby producing rubber pieces suitable for use as a supplementary fuel in industrial stoker coal-fired boilers.

9. The process according to claim 1, wherein said second specified size is approximately 0.75 inches, the process thereby producing rubber pieces suitable for use as a supplementary fuel to be mixed with coal.

10. The process according to claim 1, wherein said second specified size is approximately 0.10 inches, the process thereby producing crumb rubber.

* * * * *